(12) United States Patent
Kim et al.

(10) Patent No.: US 10,901,881 B1
(45) Date of Patent: Jan. 26, 2021

(54) SYSTEMS AND METHODS FOR TEST DEPLOYMENT OF COMPUTATIONAL CODE ON VIRTUAL SERVERS

(71) Applicant: Coupang, Corp., Seoul (KR)

(72) Inventors: Kyung Jun Kim, Seoul (KR); Sung Ho Kim, Santa Clara, CA (US)

(73) Assignee: Coupang Corp., Seoul (KR)

(*) Notice: Subject to any disclaimer, the term of this patent is extended or adjusted under 35 U.S.C. 154(b) by 0 days.

(21) Appl. No.: 16/872,603

(22) Filed: May 12, 2020

(51) Int. Cl.
- *G06F 9/44* (2018.01)
- *G06F 11/36* (2006.01)
- *G06F 11/30* (2006.01)
- *G06F 11/34* (2006.01)

(52) U.S. Cl.
CPC ........ *G06F 11/3688* (2013.01); *G06F 11/301* (2013.01); *G06F 11/3457* (2013.01); *G06F 11/3684* (2013.01); *G06F 11/3692* (2013.01)

(58) Field of Classification Search
CPC .................................................. G06F 11/3688
See application file for complete search history.

(56) References Cited

U.S. PATENT DOCUMENTS

| | | | | |
|---|---|---|---|---|
| 8,255,516 | B1* | 8/2012 | Zhang | H04L 67/10 709/224 |
| 2007/0179791 | A1* | 8/2007 | Ramesh | G06Q 10/06393 705/7.39 |
| 2008/0127067 | A1* | 5/2008 | Aubertine | G06F 9/45508 717/115 |
| 2008/0244525 | A1* | 10/2008 | Khalil | G06F 11/3688 717/124 |
| 2014/0096139 | A1* | 4/2014 | Alshinnawi | G06F 11/008 718/103 |
| 2015/0347282 | A1* | 12/2015 | Wingfors | G06F 11/3688 717/125 |
| 2020/0183811 | A1* | 6/2020 | Krishnan | G06F 11/3692 |

FOREIGN PATENT DOCUMENTS

| | | |
|---|---|---|
| JP | 2018-32281 | 3/2018 |
| JP | 2018-147257 | 9/2018 |
| KR | 10-2015-0031502 | 3/2015 |
| KR | 10-1595854 | 7/2015 |
| KR | 10-2017-0081404 | 7/2017 |

OTHER PUBLICATIONS

Preliminary Search Report dated Aug. 27, 2020, by the Korean Patent Office in Application No. KR 10-2020-0084838, 12 pages.

* cited by examiner

*Primary Examiner* — Hang Pan
(74) *Attorney, Agent, or Firm* — Finnegan, Henderson, Farabow, Garrett & Dunner, LLP (57) ABSTRACT

Methods and systems for test deployment of computational code on virtual servers are disclosed. In one embodiment, an exemplary method comprises receiving test computational code programmed to provide resources; selecting a test virtual server from a plurality of virtual servers; uploading the test computational code to the test virtual server; initializing the test computational code on the test virtual server; receiving computational performance measurements of the test virtual server and a remainder of the plurality of virtual servers; calculating a test score of the test virtual server based on the received computational performance measurements; and stopping the test computational code if the test score is outside a set range.

20 Claims, 5 Drawing Sheets

|  | Test Server | Baseline Servers | Ratio | Threshold | Status | Metric Score | Weight | Comparison Metric |
|---|---|---|---|---|---|---|---|---|
| CPU Usage | 50 | 40 | 1.25 | 1.1 | Fail | 0 | 0.25 | 0 |
| Memory Usage | 300 | 240 | 1.25 | 1.3 | Pass | 1 | 0.25 | 0.25 |
| Network Usage | 10 | 10 | 1 | 1.2 | Pass | 1 | 0.4 | 0.4 |
| Error Count | 3 | 0 | 3 | 5 | Pass | 1 | 0.1 | 0.1 |

Test Score = 0.75

SYSTEMS AND METHODS FOR TEST DEPLOYMENT OF COMPUTATIONAL CODE ON VIRTUAL SERVERS

TECHNICAL FIELD

The present disclosure generally relates to computerized systems and methods for test deployment of computational code on virtual servers. In particular, embodiments of the present disclosure relate to a system that receives test computational code and deploys the code on a test virtual server. The system also tracks resource usage of the test virtual server, and compares the resource usage of the test virtual server to resource usage of other virtual servers. In this way, new code variations may be tested with real user interactions, while also minimizing the risk of deleterious impacts on user experiences.

BACKGROUND

Proliferation of virtual servers has broadened access to large computing resources at low costs. Various corporations provide virtual server resources, also known as cloud computing. Further, companies, universities, and government organizations utilize virtual servers to host websites, perform complex computer simulations, and store large databases, among other services. Virtual servers provide secure, reliable, and scalable computational resources to clients, enabling clients to focus on creating products rather than maintaining server capability.

However, traditional systems for managing virtual server resources mirror computational code across virtual servers to standardize user experiences and simplify resource management. While this may reduce the difficulty in managing multiple virtual servers, mirroring introduces a risk that a new version of code may contain an undiscovered error that causes widespread disruption of operations. For example, a new version of a website may pass small-scale testing with no errors. However, fatal errors, such as high CPU and memory usage, may emerge when the new version of the website interacts with the higher volume and greater complexity of real user interactions. This may result in mass website outages, increased costs, and lost users and sales. Decreased reliability may also discourage future use of a service.

Accordingly, there is a need for systems and methods to allow testing of software on virtual services and while limiting the impact of an unforeseen software failure.

SUMMARY

One aspect of the present disclosure is directed to a computer-implemented system for test deployment of computational code on virtual servers. The system comprises a memory storing instructions and at least one processor configured to execute the instructions to perform operations including: receiving test computational code; selecting a test virtual server from a plurality of virtual servers; uploading the test computational code to the test virtual server; initializing the test computational code on the test virtual server; receiving computational performance measurements of the test virtual server and a remainder of the plurality of virtual servers; calculating a test score of the test virtual server based on the received computational performance measurements; and stopping the test computational code if the test score is outside a set range.

Another aspect of the present disclosure is directed to a computer-implemented method for test deployment of computational code on virtual servers. The method includes: receiving test computational code; selecting a test virtual server from a plurality of virtual servers; uploading the test computational code to the test virtual server; initializing the test computational code on the test virtual server; receiving computational performance measurements of the test virtual server and a remainder of the plurality of virtual servers; calculating a test score of the test virtual server based on the received computational performance measurements; and stopping the test computational code if the test score is outside a set range.

Another aspect of the present disclosure is directed to a computer-implemented system for test deployment of computational code on virtual servers. The system comprises a memory storing instructions and at least one processor configured to execute the instructions to perform operations including: receiving test computational code and baseline computational code; selecting a test virtual server from a plurality of virtual servers; uploading the test computational code to the test virtual server; uploading the baseline computational code to a remainder of the plurality of virtual servers; initializing the test computational code on the test virtual server; initializing the baseline computational code on the remainder of the plurality of virtual server; receiving measurements of CPU usage of the test virtual server and the remainder of the plurality of virtual servers; calculating a first average of the measurements of CPU usage of the test virtual server over a set period of time; calculating a second average of the measurements of CPU usage of the remainder of the plurality of virtual servers over the set period of time; calculating a ratio of the first average over the second average; stopping the test computational code if the ratio exceeds a threshold.

Other systems, methods, and computer-readable media are also discussed herein.

DETAILED DESCRIPTION

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods for test deployment of computational code on virtual servers. Virtual servers provide operations redundancy unavailable in traditional server operations. For example, if an organization hosts a website, the website's code may be replicated in multiple virtual servers. If one virtual server fails, a user's request for the website may be seamlessly redirected to a different server, without the user being alerted to the presence of an error. This redundancy further allows live testing of new versions of code. Test code may be run on a subset of virtual servers, and performance metrics may be compared between the servers. For example, a new website may be deployed on one virtual server, while the remaining virtual servers continue hosting the previous version of the website. If a flaw emerges in the new website that interrupts user experience, users may be transferred to virtual servers hosting the previous version of the website with minimal disruption to the user. Additionally, data derived from the test may inform decisions about full operational deployment of a test computational code.

Figure 1:
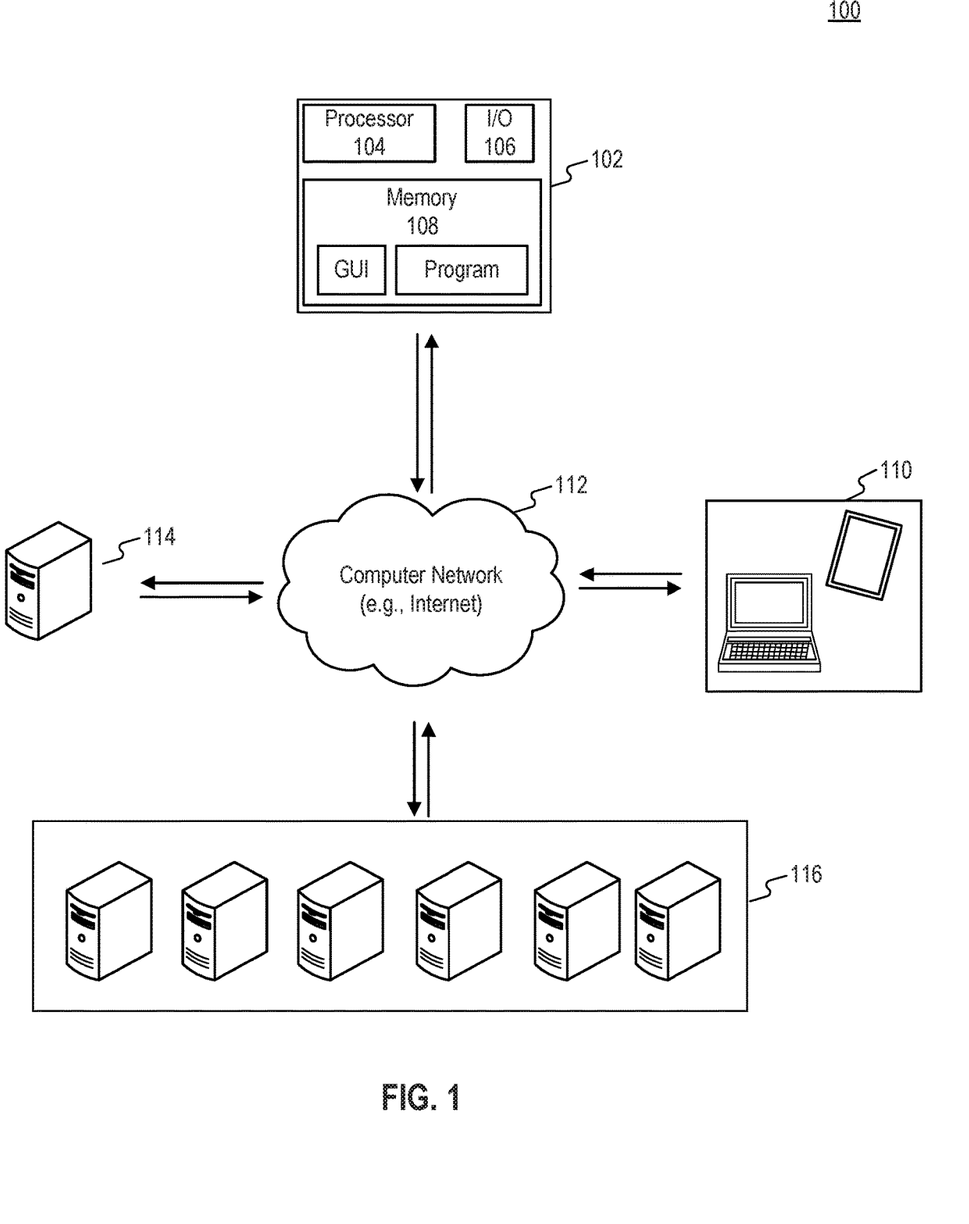
FIG. 1 illustrates a network enabling access to virtual servers, consistent with the disclosed embodiments.

FIG. 1 shows a network 100 including virtual server test deployment system 102. System 102 includes at least one processor 104, an input/output (I/O) device that allows data to be transmitted 106, and at least one memory 108. Memory 108 stores a program for operating the virtual server test deployment system 102. Memory 108 may also store instructions for a graphical user interface (GUI). System 102 may be embodied as a virtual server. In some embodiments, system 102 may also operate as a configuration management database for virtual servers.

Furthermore, processor 104 may be a generic or specific electronic device capable of manipulating or processing information. For example, the processor may include any combination of any number of a central processing unit (or "CPU"), a graphics processing unit (or "GPU"), an optical processor, a programmable logic controllers, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), and any type of circuit capable of data processing. The processor may also be a virtual processor that includes one or more processors distributed across multiple machines or devices coupled via a network.

Additionally, memory 108 may be a generic or specific electronic device capable of storing codes and data accessible by the processor (e.g., via a bus, not shown). For example, the memory may include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or any type of storage device. The codes may include an operating system (OS) and one or more application programs (or "apps") for specific tasks. Memory 108 may also be a virtual memory that includes one or more memories distributed across multiple machines or devices coupled via a network.

System 102 is connected to a computer network 112. For example, computer network 112 may include any combination of any number of the Internet, an Intranet, a Local-Area Network (LAN), a Wide-Area Network (WAN), a Metropolitan-Area Network (MAN), a virtual private network (VPN), a wireless network (e.g., compliant with the IEEE 802.11a/b/g/n), a wired network, a leased line, a cellular data network, and a network using Bluetooth connections, infrared connections, or Near-Field Communication (NFC) connections.

System 102 is further connected, either directly or via computer network 112, to customer devices 110. Customer devices 110 may include a laptop, standalone computer, mobile phone, and the like. A user may send a request for virtual server resources by selecting a webpage associated with test deployment of computational code on virtual servers using customer devices 110 via network 112.

Additionally, system 102 is connected, either directly or via computer network 112, to developer device 114. Developer device 114 may be a laptop, standalone computer, mobile phone, and the like. A developer may use developer device 114 to write computational code to be run on a virtual server, or to construct a database to be stored on a virtual server. Developer device 114 may also be used to perform preliminary testing, such as with synthetic user interactions. For example, developer device 114 may include a database of historical user interactions with a website. A developer may use the database to perform initial testing of new code prior to deployment.

System 102 communicates with virtual server provider 116. Provider 116 may, for instance, be a service operating a plurality of servers or general purpose computers, such as a server farm, which are available for rent or purchase. In some embodiments, provider 116 may charge a user for processing time, processor capability, storage, or connectivity, such as bandwidth. Provider 116 may also charge users a set baseline for connection to virtual servers, regardless of level of use, as a retainer to guarantee future access. Provider 116 may have servers and computers of varying capabilities, and may sell systems to users while charging maintenance fees. Other arrangements for selling virtual server resources by provider 116 are possible as well.

In some embodiments, customer devices 110 may connect to services hosted by virtual servers of provider 116 via network 112. For example, a company may use servers operated by provider 116 to host an e-commerce website. Customer devices 110 may then connect to the e-commerce website via network 112. In this way, customers may access a company's website by interacting with virtual servers operated by provider 116. This may provide a company with the convenience of not having organic employees to operate servers, and reduce costs by only paying for the amount of computing power the company needs. Alternatively, customer devices 110 may be research collaborators, for instance, who are able to share common data stored by the virtual servers of provider 116 or computing power without maintaining and operating servers.

In some embodiments, developer device 114 communicates with system 102 to coordinate testing of test computational code. For example, a developer may finish preliminary testing of code that is ready for testing with live user interactions. The developer may submit a request using developer device 114 for testing resources. The request may be transferred to system 102 via network 112. System 102 may then confirm that the test may proceed, for instance, by confirming that quality assurance checks have been completed, or by performing quality assurance checks, such as running the code with use cases to attempt to trigger an error state, or ensuring run time and resource usage remain below thresholds. System 102 may also select testing resources from among the virtual server resources of provider 116 and upload the test computational code to the selected testing resource. Alternatively, developer device 114 may upload the test computational code after receiving testing resource identifiers, such as an IP address, MAC address, or virtual server identifier, from system 102.

Further, system 102 may direct requests from customer devices 110. For example, in some embodiments, many virtual servers may redundantly host a website. When a request for the website is received from a customer device, system 102 may determine which of the virtual servers will process the request and communicate with the customer device. Additionally, if one of the virtual servers is identified as a test server, system 102 may determine whether or not a request from a device is sent to a test server rather than an operational server based on characteristics of the request, such as geographic origin, device type, or historical requests from the device.

In some embodiments, any or all of system 102, developer device 114, and consumer device 110, or subsystems thereof (e.g., memory, processing) may be operated by a virtual server of provider 116. For example, a developer may have a terminal connected to a virtual server, and use a processor of the virtual server to compile and test code. Additionally, processor 104 of system 102 may be a processor of a virtual server.

Figure 2:
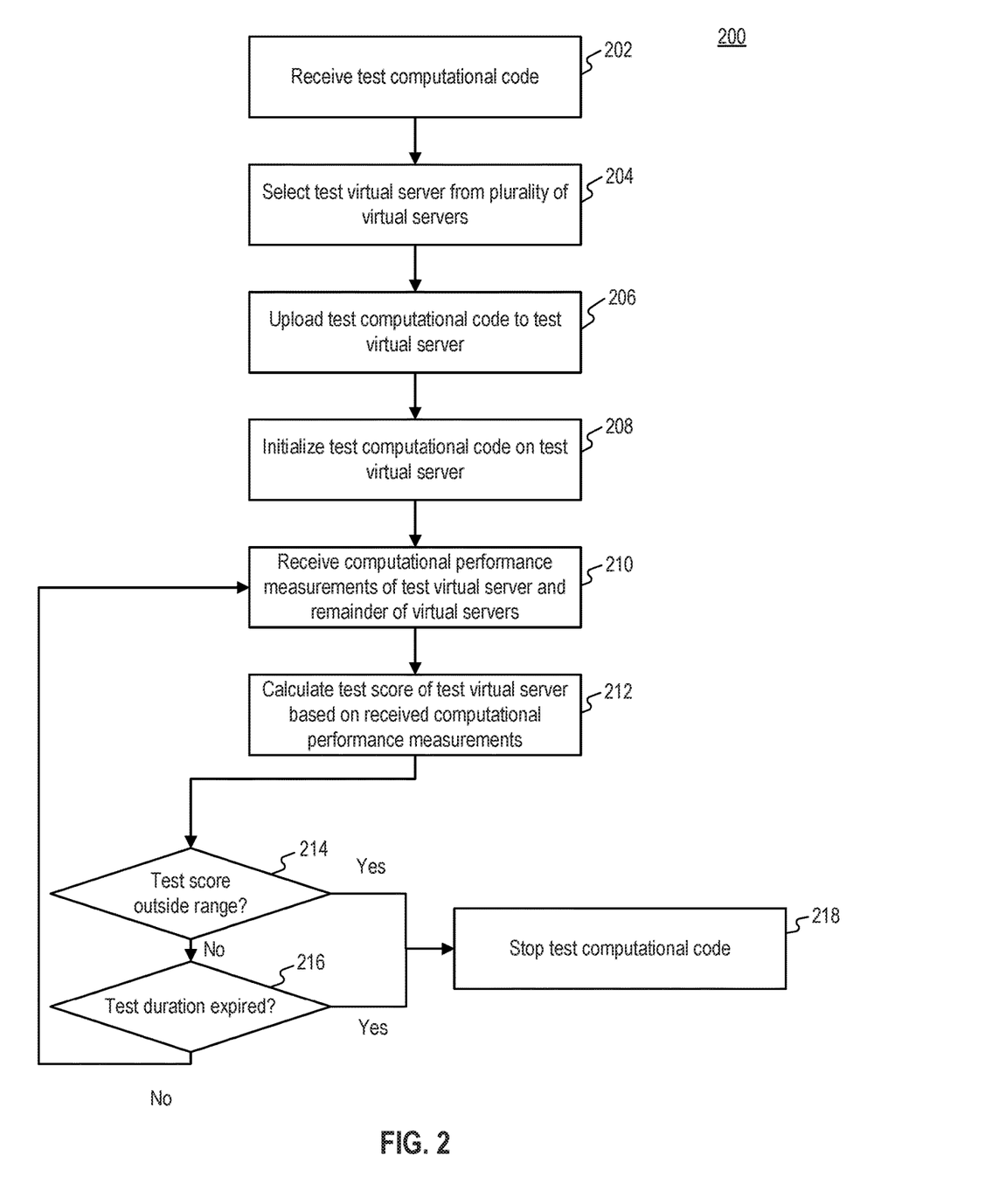
FIG. 2 is a flowchart of a test computational code deployment process, consistent with the disclosed embodiments.

FIG. 2 is a flowchart of a test computational code deployment process 200, consistent with the disclosed embodiments. System 102 may perform process 200. For example, instructions for performing the process 200 may be stored on the memory 108 and implemented by the processor of system 102. Process 200 includes the following steps.

Step 202 includes receiving test computational code. A developer may provide the test computational code using developer device 114. For example, a developer may use developer device 114 to write the test computational code from scratch, use template language (e.g., in a YAML or JSON format), or upload the test computational code into developer device 114. When a developer submits code for testing, the developer may provide a role to which the test computational code corresponds. For instance, an organization may employ ten virtual servers for website hosting, and five other virtual servers for email storage. The developer may indicate that test code is for the website hosting role.

The developer may also provide information of a desired test scenario, such as a type of desired interaction, a number of interactions, or a test duration. For example, if test code includes new methods to confirm cryptocurrency transactions, the developer may indicate that the code should be tested with 1,000 interactions of users attempting to purchase items using a Bitcoin wallet. Step 202 may further include determining additional aspects of the desired test scenario. Based on the number of requested test interactions, step 202 may calculate a number of baseline test operations against which the test operations will be compared. Continuing the scenario of purchases using a Bitcoin wallet, step 202 may determine that, in order to obtain a desired level of statistical confidence in the software test, the test code will be used in 1,000 interactions, and compared to performance of a baseline code from 2,000 interactions. Step 202 may use statistical analyses, such as a Poisson or Gaussian distribution, to determine the number of baseline and test interactions required for a desired statistical power. Additionally, step 202 may utilize design of experiment methods, such as blocking, randomization, and replication, to optimize statistical confidence while reducing the number of required tests, as well as test cost and time.

In some embodiments, step 202 may include receiving multiple variations of test code. For example, continuing the cryptocurrency transaction from above, a developer may provide test code for a first method of submitting Bitcoin transactions in batches at scheduled times during a day, and a second method of submitting Bitcoin transactions on demand when a user initiates a transaction.

Step 204 includes selecting a test virtual server from a plurality of virtual servers. The test virtual server may be selected randomly from among the virtual servers used for the role designated by the developer. If a developer submits multiple test versions of code, step 204 may include identifying a plurality of test virtual servers. Step 204 may also include confirming that a virtual server has resources necessary to operate the test code. For example, a developer may indicate that a processor capable of sustained operations at 3.9 GHz is needed to operate a test code, and step 204 may identify a subset of the virtual servers performing the role which meet the resource requirement before selecting a test virtual server.

Further, if design of experiments methodologies are used, step 204 may include identifying a block of servers to perform a test, as well as creating a test schedule. For example, one server may operate the test on a first day, a second server on a second day, etc. In this way, a greater statistical confidence in test results may be obtained in a shorter time. Additionally, test results may be more reliable, as the results of a single faulty server would be diluted in view of results from other properly-functioning servers.

Step 206 includes uploading the test computational code to the test virtual server. In some embodiments, step 206 may also include uploading resource files, such as a database, variable value, or model parameters. System 102 may upload the test computational code, or may provide a permission key or virtual server identifier to developer device 114 to enable the developer to upload code. If multiple virtual servers are selected at step 204, code may be uploaded to each selected virtual server simultaneously, or may be uploaded at a designated time corresponding to a scheduled replication.

Step 208 includes initializing the test computational code on the test virtual server, such as by testing checksums to ensure that code was uploaded without transmission errors, provisioning resources, and directing user requests to the test virtual server. Additionally, system 102 may run preliminary tests on the test virtual server and confirm that the test code is functioning properly, for instance, by comparison to test results performed by the developer. If preliminary virtual server tests fail, such as differing from preliminary test results, or if errors arise, system 102 may halt the test and provide an indication to the developer before allowing user interactions with the test virtual server. This may enable a developer to correct misconfigurations, such as latent tests parameters incorporated into the code for local testing which a developer forgot to reconfigure before upload to a virtual server.

In some embodiments, a developer may desire to compare performance of a test version of computational code against a baseline version of code to determine if the test version performs in a comparable manner to the baseline code, such as consuming a similar amount of processing power, memory, or bandwidth of a virtual server. The baseline computational code and the test computational code may be associated with a role. Further, the test computational code may be a beta version of the baseline computational code. For example, a baseline code may implement credit card processing for purchases on an e-commerce website, and the test computational code may be a beta version of the credit card processing code that a developer believes will improve processing time. In some scenarios, such as if the baseline code is not already running on a virtual server, or if the baseline code is not standardized among virtual servers, step 208 may further include initializing baseline computational code on the remainder of the plurality of virtual servers (i.e., servers not selected as a test server).

Step 210 includes receiving computational performance measurements of the test virtual server and a remainder of the plurality of virtual servers. The measurements may be a rate, such as processing power measured in GHz, or network usage, measured in, for example, Mbps. Measurements may also include an amount of memory usage, or an error count. The measurements may be reported by the provider and obtained through an API. The measurements may be provided in real-time, or a measurement log may be reported at intervals. Further, the test and/or baseline codes may include commands to report measurements or perform tests to identify measurements, such as timing a parallel process, and provide reports to system 102 independent of reports from the virtual server provider. The test and/or baseline codes may also be configured to report any errors encountered during operation, including information such as a line of code where an error occurred, an error identifier, variable values, timestamps, and other diagnostic information. An error report may be provided in real-time, or an error report may be provided at a set interval, including, for instance, error frequency by type or time. In some embodiments, measurements may be unavailable due to a reporting error. These missing measurements may be flagged for developer review, or may be counted as an error.

Step 212 includes calculating a test score of the test virtual server based on the received computational performance measurements. System 102 may calculate the test score, described in further detail by reference to FIG. 3.

Figure 3:
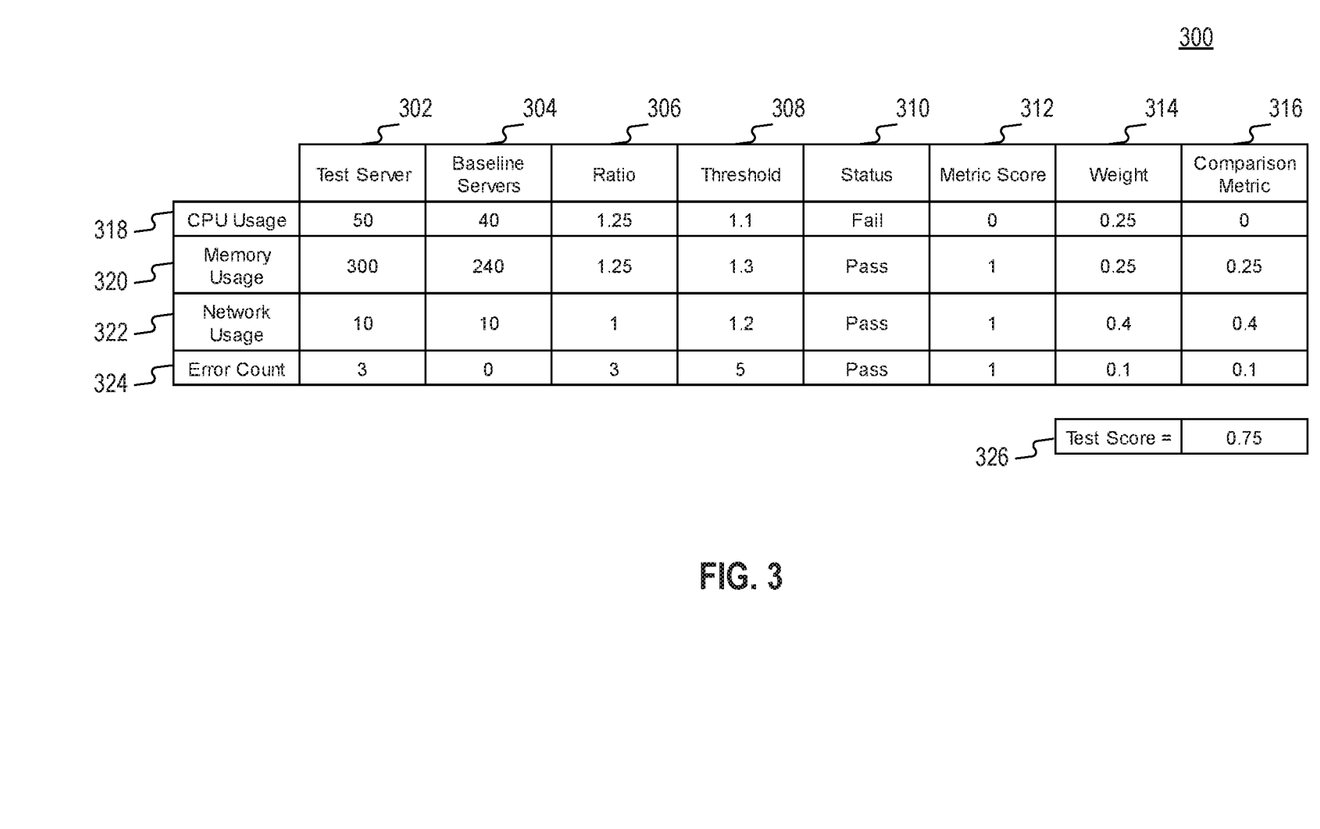
FIG. 3 illustrates calculation of a test score, consistent with the disclosed embodiments.

FIG. 3 illustrates calculation of a test score, consistent with the disclosed embodiments. FIG. 3 shows a chart 300 with a plurality of measurement values and calculated values for a plurality of performance metrics, such as CPU usage 318, memory usage 320, network usage 322, and error count 324. The measurement values may reflect an average, peak, or total count of each performance metric corresponding to a set duration of time, such as a test duration specified by a developer. Further, the measurement values may reflect average, peak, or total count corresponding to a set number of operations, for instance, 1,000 user interactions. This may help ensure that a test has reliable data, as a 24-hour test over a weekend may encounter different forms and numbers of user interactions than a 24-hour test over a weekday.

Test server measurements 302 reflects data from the test virtual server over the test period. For instance, the error count 324 of the test server was 3 during the test period. Network usage 322 may be measured as a rate, such as an average Mbps over the test period, or a total amount of data transferred over the test period. CPU usage 318 may also be measured as an average rate, or a total number of computations performed during a test period. If multiple test servers are used, either simultaneously or in replicate blocks over time, test server measurement 302 may be cumulative or average measurement of performance metrics for all test servers. Similarly, baseline server measurements 304 may also reflect cumulative or average measurement of performance metrics for all baseline servers. In some embodiments, outlier metrics, such as a server using greater than three standard deviations more or less than an average resource consumption, may be omitted.

Ratio values 306 reflect the ratio of a test server value over a baseline server value. For example, as illustrated in the example data of chart 300, test server 302 used an average of 300 MB of memory during the test period, while the baseline servers used 240 MB, yielding a ratio of 300/240=1.25. In some embodiments, a null value, such as the error count 324 of baseline servers measurements 304, may be omitted when determining a ratio.

System 102 may also store a threshold ratio 308 that is required for a test server to pass. A threshold value may be used as well (e.g., no more than 2 errors are permitted, or no more than 500 MB of memory may be used). Status field 310 may be determined by comparison of a ratio 306 to a corresponding threshold 308. Thus, as shown in chart 300, status 310 of CPU usage 318 is "Fail" because the ratio of 1.25 is greater than the threshold of 1.1, while the status 310 of memory usage 320 is "Pass" because the ratio of 1.25 is less than the threshold of 1.3. Further, status field 310 may be converted to a metric score 312 of, for instance, 0 or 1 depending on the status as fail or pass, respectively.

Chart 300 also displays a weight 314 assigned to each performance metric. An organization may assign weights to performance metrics indicating relative importance. For example, an overage of CPU usage may result in a higher fee charged by a virtual server provider than an overage in memory usage, and the weight of CPU usage may therefore be greater than the weight of memory usage. Weights 314 and corresponding metric scores are multiplied to yield a comparison metric score 316 for each metric. Thus, comparison metrics may be calculated based on comparing computational performance measurements of the test virtual server to an average of computational performance measurements of the remainder of the plurality of virtual servers. Further, the test score may comprise a product of at least one comparison metric and a weight.

Additionally, the test score 326 may be a sum of the comparison metrics 316. Thus, test score 326 may represent a comprehensive analysis of the performance of a test computational code. In additional embodiments, the test score may comprise at least one comparison between a measurement and a threshold, without a comparison to a baseline value.

Returning to FIG. 2, after step 212, process 200 proceeds to step 214 to determine if the test score is outside of a set range. In some embodiments, the set range may be determined by an internal user (e.g., developers, employees of an organization that owns, operates or leases system 100). If the test score is inside the set range, step 214 is NO, and process 200 proceeds to step 216 to determine if the test duration, measured as either a time or a number of operations, has expired. If step 216 is NO, process 200 returns to step 210 to receive computational performance measurements. However, if either of step 214 or step 216 are YES, such that a test score is outside of the set range or the test duration has expired, process 200 proceeds to step 218 and stops the test computational code, for instance, by routing traffic to non-test servers. In this way, system 102, utilizing process 200, may ensure that test code continues operating at minimum performance standards. Thus, system 102 may ensure that user experience is not diminished despite users' interactions being used to test new software. Further, if the set duration of time or set number of operations is small, process 200 may quickly identify if test code is operating below organization standards, as represented by the test score, and stop the test computational code, for instance by redirecting traffic to non-test servers, so that harm to user experience in minimized.

In some embodiments, system 102 may direct traffic to a test or non-test virtual server based on a priority level. For example, requests from IP addresses or MAC addresses having a high purchase history may be directed to non-test servers so that frequent users of the site do not experience any decrement in service as a result of a beta test of software. This may provide high value users with a more stable website interaction, thereby retaining more customers. Alternatively, high value or paying customers may be granted "early access" rights to beta versions before low value customers to provide an enhanced user interaction.

Figure 4:
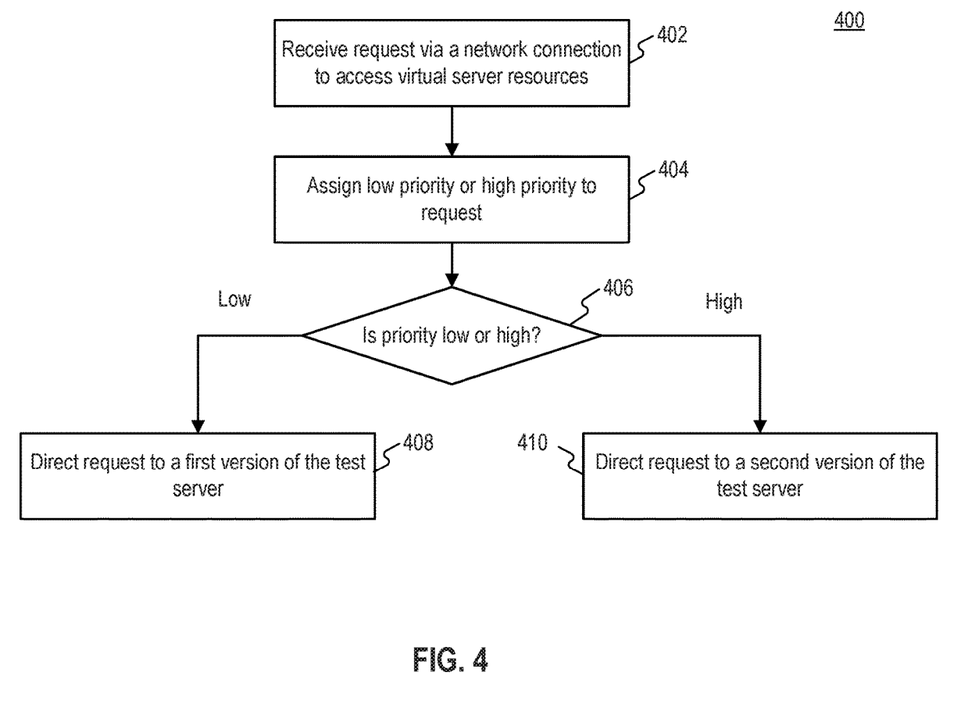
FIG. 4 is a flowchart of directing a request to different versions of a test server based on request priority, consistent with the disclosed embodiments.

FIG. 4 is a flowchart process 400 for directing a request to different versions of a test server based on request priority, consistent with the disclosed embodiments. System 102 may perform process 400 along with process 200, for example. In some embodiments, routing requests according to priority may be performed by virtual servers. For example, a first version of a test virtual server may identify a request as having high priority and forward the request to a second version of the test virtual server.

Step 402 includes receiving a request via a network connection to access virtual server resources. The request may come from customer device 110, for instance, and may be a request for images and HTML code corresponding to a website hosted by virtual servers.

Step 404 includes assigning a low priority or a high priority to the request. For example, system 102 may assign a priority to the request when it receives the request based on user information associated with the user who submits the request to system 102. For example, user information may include IP addresses or MAC addresses associated with the user who submits a request. The priority of a request may be determined according to a customer tier, historical customer purchases, additional fees paid by the customer, geographic origin, device type, connection speed, and the like. For example, if the second version of the test computational code is known to provide an enhanced user interaction than first version of the test computational code, then more high priority requests may be routed to the second version of the test computational code to provide more users with an enhanced experience.

Step 406 includes determining if the priority of the request is low or high. Step 406 may be performed by a different device from the device that performs steps 402 and 404. For example, system 102 may receive a request, assign a priority, and then forward the request to a virtual server provider. If the request is low priority, process 400 proceeds to step 408 and directs the request to the first version of the test virtual server. If the request is high priority, process 400 proceeds to step 410 and directs the request to the second version of the test virtual server. In some embodiments, steps 408 and 410 may be reversed, such that a low priority request is directed to a second version of the test virtual server, and a high priority request is directed to a first version of the test virtual server, for instance, when the second version of the test server is known to require more time to process a request than first version of the test server. Even if the second version provides an enhanced user experience, more requests may be routed to the first version to more quickly process a backlog of requests.

Figure 5:
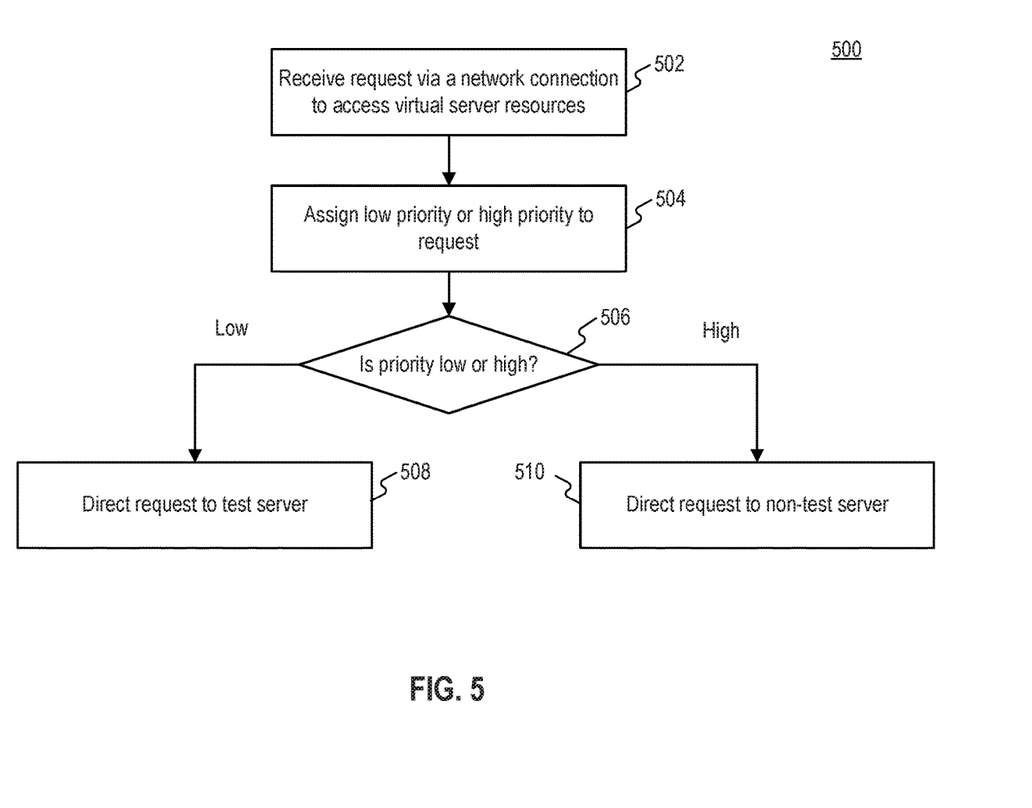
FIG. 5 is a flowchart of directing a request to a test server based on request priority, consistent with the disclosed embodiments.

FIG. 5 is a flowchart of process 500 for directing a request to a test server based on request priority, consistent with the disclosed embodiments. System 102 may perform process 500 along with process 200, for example. In some embodiments, routing requests according to priority may be performed by virtual servers. For example, a test virtual server may identify a request as having high priority and forward the request to a non-test virtual server.

Step 502 includes receiving a request via a network connection to access virtual server resources. The request may come from customer device 110, for instance, and may be a request for images and HTML code corresponding to a website hosted by virtual servers. Step 504 includes assigning a low priority or a high priority to the request. For example, system 102 may assign a priority to the request when it receives the request based on user information associated with the user who submits the request to system 102. For example, user information may include IP addresses or MAC addresses associated with the user who submits a request. The priority of a request may be determined according to a customer tier, historical customer purchases, additional fees paid by the customer, geographic origin, device type, connection speed, and the like. Additionally, during times of high volume traffic, priority may be assigned to distribute traffic among virtual servers and better handle increased volume. For example, if a test computational code is known to require more time to process a request than a baseline computational code, the test may be throttled and more requests routed to baseline servers to more quickly process a backlog of requests.

Step 506 includes determining if the priority of the request is low or high. Step 506 may be performed by a different device from the device that performs steps 502 and 504. For example, system 102 may receive a request, assign a priority, and then forward the request to a virtual server provider. If the request is low priority, process 500 proceeds to step 508 and directs the request to the test virtual server. If the request is high priority, process 500 proceeds to step 510 and directs the request to a server among the remainder of the plurality of virtual servers. In some embodiments, steps 508 and 510 may be reversed, such that a low priority request is directed to a non-test server, and a high priority request is directed to a test server, for instance, when the test server is hosting a new capability reserved for high priority requests.

As an exemplary embodiment of the present disclosure, a computer-implemented system for test deployment of computational code on virtual servers may comprise a memory storing instructions and at least one processor configured to execute the instructions to perform operations. The operations may include receiving test computational code and baseline computational code. The operations also include selecting a test virtual server from a plurality of virtual servers, uploading the test computational code to the test virtual server, and uploading the baseline computational code to a remainder of the plurality of virtual servers. Further, the operations include initializing the test computational code on the test virtual server; and initializing the baseline computational code on the remainder of the plurality of virtual server. The operations also receive measurements of CPU usage of the test virtual server and the remainder of the plurality of virtual servers; calculate a first average of the measurements of CPU usage of the test virtual server over a set period of time; calculate a second average of the measurements of CPU usage of the remainder of the plurality of virtual servers over the set period of time; and calculate a ratio of the first average over the second average. If the ratio exceeds a threshold, the operations stop the test computational code.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for test deployment of computational code on virtual servers, the system comprising:
   a memory storing instructions; and
   at least one processor configured to execute the instructions to perform operations comprising:
      receiving test computational code, wherein the test computational code is programmed to provide resources;
      selecting a test virtual server from a plurality of virtual servers;
      uploading the test computational code to the test virtual server;
      initializing the test computational code on the test virtual server;
      receiving computational performance measurements of the test virtual server and a remainder of the plurality of virtual servers;
      calculating a test score of the test virtual server based on the received computational performance measurements, wherein calculating the test score comprises:
         calculating a first average of the computational performance measurements of the test virtual server,
         calculating a second average of the computational performance measurements of the remainder of the plurality of virtual servers, and
         determining the test score based on the first average and the second average; and
      stopping the test computational code if the test score is outside a set range.

2. The system of claim 1, wherein the operations further comprise:
   initializing baseline computational code on the remainder of the plurality of virtual servers; and
   wherein the baseline computational code and the test computational code are associated with a role.

3. The system of claim 2, wherein the test virtual server is randomly selected from the plurality of virtual servers.

4. The system of claim 2, wherein the test computational code is a beta version of the baseline computational code.

5. The system of claim 1, wherein the computational performance measurements comprise at least one of CPU usage, memory usage, network usage, or error counts.

6. The system of claim 5, wherein calculating the test score further comprises:
   calculating a ratio of the first average over the second average; and
   determining the test score based on the ratio.

7. The system of claim 6, wherein the test score comprises a product of the ratio and a weight.

8. The system of claim 1, wherein the test score is determined based on received computational performance measurements corresponding to a set duration of time.

9. The system of claim 1, wherein the test score is determined based on received computational performance measurements corresponding to a set number of operations.

10. The system of claim 1, wherein the resources comprise virtual server resources, and
   the operations further comprise:
      assigning a low priority or a high priority to a request;
      directing the request to the test virtual server when the request is low priority; and
      directing the request to a virtual server among the remainder of the plurality of virtual servers when the request is high priority.

11. A computer-implemented method for test deployment of computational code on virtual servers, the method comprising:
   receiving test computational code, wherein the test computational code is programmed to provide resources;
   selecting a test virtual server from a plurality of virtual servers;
   uploading the test computational code to the test virtual server;
   initializing the test computational code on the test virtual server;
   receiving computational performance measurements of the test virtual server and a remainder of the plurality of virtual servers;
   calculating a test score of the test virtual server based on the received computational performance measurements, wherein calculating the test score comprises:
      calculating a first average of the computational performance measurements of the test virtual server,
      calculating a second average of the computational performance measurements of the remainder of the plurality of virtual servers, and
      determining the test score based on the first average and the second average; and
   stopping the test computational code if the test score is outside a set range.

12. The method of claim 11, further comprising:
   initializing baseline computational code on the remainder of the plurality of virtual servers; and wherein the baseline computational code and the test computational code are associated with a role.

13. The method of claim 12, wherein the test virtual server is randomly selected from the plurality of virtual servers.

14. The method of claim 12, wherein the test computational code is a beta version of the baseline computational code.

15. The method of claim 11, wherein the computational performance measurements comprise at least one of CPU usage, memory usage, storage usage, network usage, or error counts.

16. The method of claim 15, wherein calculating the test score further comprises:
calculating a ratio of the first average over the second average; and
determining the test score based on the ratio.

17. The method of claim 16, wherein the test score comprises a product of the ratio and a weight.

18. The method of claim 11, wherein the test score is determined based on received computational performance measurements corresponding to a set duration of time.

19. The method of claim 11, wherein the test score is determined based on received computational performance measurements corresponding to a set number of operations.

20. A computer-implemented system for test deployment of computational code on virtual servers, the system comprising:
a memory storing instructions; and
at least one processor configured to execute the instructions to perform operations comprising:
receiving test computational code and baseline computational code, each of the test computational code and baseline computational code being programmed to provide resources;
selecting a test virtual server from a plurality of virtual servers;
uploading the test computational code to the test virtual server;
uploading the baseline computational code to a remainder of the plurality of virtual servers;
initializing the test computational code on the test virtual server;
initializing the baseline computational code on the remainder of the plurality of virtual servers;
receiving measurements of CPU usage of the test virtual server and the remainder of the plurality of virtual servers;
calculating a first average of the measurements of CPU usage of the test virtual server over a set period of time;
calculating a second average of the measurements of CPU usage of the remainder of the plurality of virtual servers over the set period of time;
calculating a ratio of the first average over the second average; and
stopping the test computational code if the ratio exceeds a threshold.

* * * * *